United States Patent
Jain et al.

(10) Patent No.: US 10,638,254 B2
(45) Date of Patent: Apr. 28, 2020

(54) HANDLING AN EARLY POSITION FIX FOR LPP-TYPE POSITIONING SESSIONS

(71) Applicant: QUALCOMM Incorporated, San Diego, CA (US)

(72) Inventors: Amit Jain, San Diego, CA (US); Govind Ram Venkat Narayan, San Diego, CA (US); Santosh Munirathna, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/409,256

(22) Filed: Jan. 18, 2017

(65) Prior Publication Data

US 2018/0206062 A1 Jul. 19, 2018

(51) Int. Cl.
| | | |
|---|---|---|
| H04W 4/02 | (2018.01) | |
| G01S 5/02 | (2010.01) | |
| G01S 1/02 | (2010.01) | |
| H04W 4/90 | (2018.01) | |

(52) U.S. Cl.
CPC .......... *H04W 4/02* (2013.01); *G01S 1/02* (2013.01); *G01S 5/0257* (2013.01); *H04W 4/025* (2013.01); *H04W 4/90* (2018.02)

(58) Field of Classification Search
CPC ............ H04L 43/0852; H04L 43/0864; H04L 47/805; H04L 51/18; H04W 24/08; H04W 4/023; H04W 72/0446; H04W 24/10; H04W 36/32; H04W 36/36; H04W 48/04; H04W 48/10; H04W 4/02; H04W 4/14; H04W 60/04; H04W 64/00; H04W 64/003; H04W 68/02; H04W 72/042; H04W 88/02; G01S 5/0257
See application file for complete search history.

(56) References Cited

U.S. PATENT DOCUMENTS

| | | |
|---|---|---|
| 2009/0164689 A1 | 6/2009 | Luba et al. |
| 2012/0129551 A1 | 5/2012 | Islam |
| 2013/0122929 A1 | 5/2013 | Al-Mufti et al. |
| 2013/0229907 A1 | 9/2013 | Wen et al. |
| 2015/0208197 A1 | 7/2015 | Keskitalo et al. |
| 2015/0230057 A1* | 8/2015 | Jiang .................... G01S 5/0263 455/404.2 |
| 2016/0223641 A1 | 8/2016 | Cheng et al. |

FOREIGN PATENT DOCUMENTS

EP 2474838 A1 * 7/2012 ............. G01C 21/20

OTHER PUBLICATIONS

International Search Report and Written Opinion—PCT/US2017/065202—ISA/EPO—dated Mar. 16, 2018.
"3rd Generation Partnership Project; Technical Specification Group Radio Access Network; Evolved Universal Terrestrial Radio Access Network; Evolved Universal Terrestrial Radio Access (E-UTRA); LTE Positioning Protocol (LPP), (Release 13)", 3GPP TS 36.355, V13.3.0, Dec. 2016, pp. 1-141.

* cited by examiner

*Primary Examiner* — George Eng
*Assistant Examiner* — Jing Gao
(74) *Attorney, Agent, or Firm* — Hunter Clark PLLC

(57) ABSTRACT

Example methods, apparatuses, and/or articles of manufacture are disclosed herein that may be utilized, in whole or in part, to facilitate and/or support one or more operations and/or techniques for handling an early position fix for LPP-type positioning sessions, such as for use in or with mobile communication devices, for example.

28 Claims, 5 Drawing Sheets

HANDLING AN EARLY POSITION FIX FOR LPP-TYPE POSITIONING SESSIONS

BACKGROUND

1. Field

The present disclosure relates generally to position or location estimations of mobile communication devices and, more particularly, to handling an early position fix for Long Term Evolution (LTE) positioning protocol (LPP)-type positioning sessions for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance parameters obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless or electronic communications network. Acquired wireless signals may, for example, be processed by or at a mobile communication device, and its location may be estimated using known techniques, such as Advanced Forward Link Trilateration (AFLT), base station identification, cell tower triangulation, or the like.

In an indoor or like environment, such as urban canyons, for example, mobile communication devices may be unable to reliably receive or acquire satellite or like wireless signals to facilitate and/or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless transmitter devices, such as cellular base stations, access points, etc. positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

In some instances, a position fix of a mobile communication device may be obtained in connection with an observed time difference of arrival (OTDOA) technique. In this technique, a mobile communication device may measure timing differences between reference signals received from two or more pairs of cellular base stations, for example, and may respond with measurements for obtaining a position fix based, at least in part, on known locations and transmission timing for the measured base stations. An OTDOA positioning technique may, for example, be employed, in whole or in part, for purposes of traveling, navigation, direction finding, social media applications, or like services. An OTDOA positioning technique may also be employed to assist in localization of a mobile communication device in the event of an emergency call, such as in compliance with Emergency 911 (E911) mandates from the Federal Communication Commission (FCC). At times, however, OTDOA or like positioning accuracy may be affected, at least in part, by one or more Quality of Service (QoS) parameters, such as specified by a location server via OTDOA assistance data, for example.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
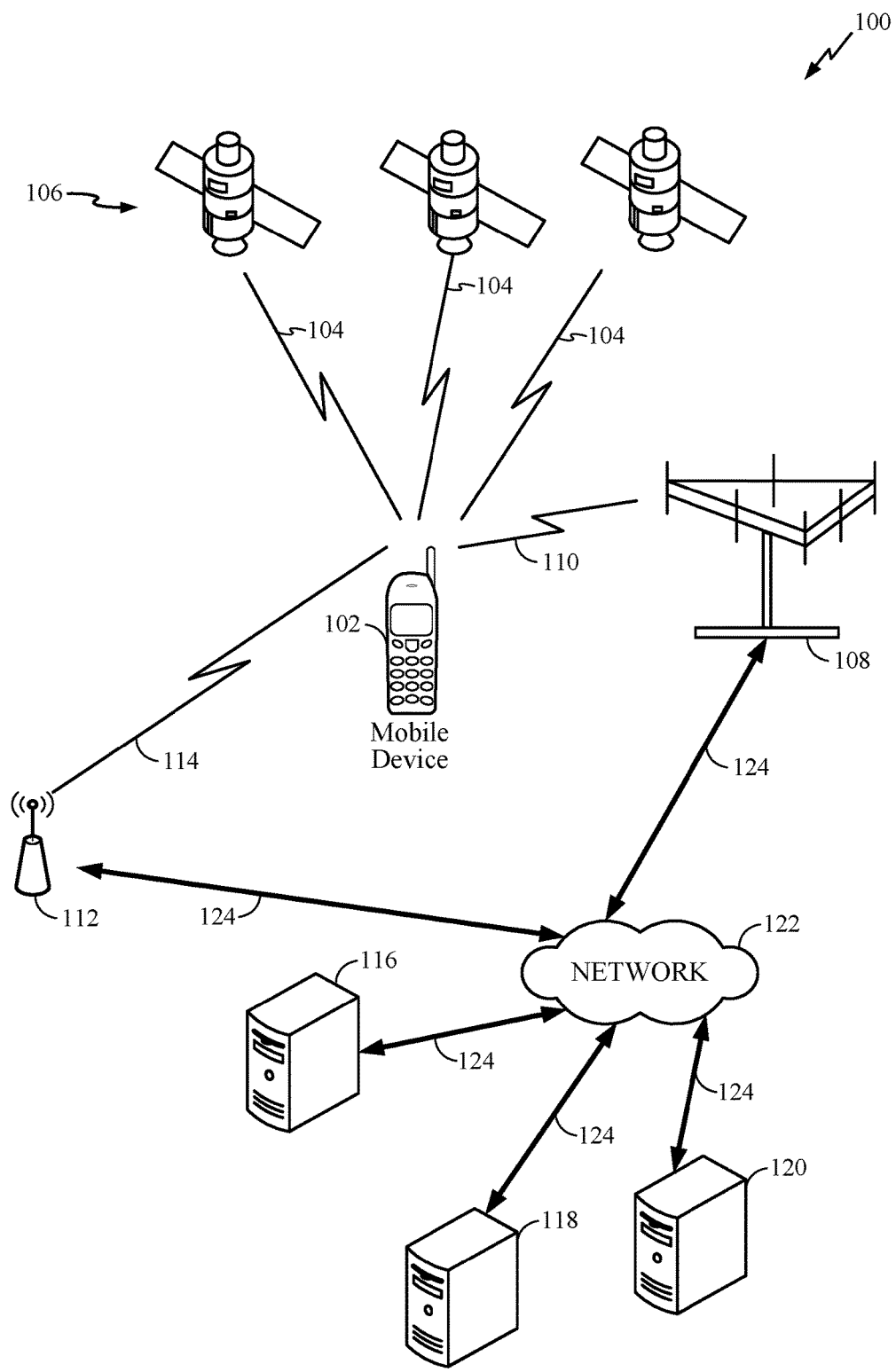
FIG. 1 is a schematic diagram illustrating features associated with an implementation of an example operating environment.

Example implementations relate to techniques for handling an early position fix for LPP-type positioning sessions. In one implementation, a method may comprise, for example, receiving, at a mobile device, a location request message requesting parameters indicative of a location of the mobile device, the location request message specifying one or more timer values by which the mobile device is to provide one or more response messages comprising the requested parameters; and transmitting an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device.

In another implementation, an apparatus may comprise means for receiving a location request message requesting parameters indicative of a location of a mobile device, the location request message specifying one or more timer values by which the mobile device is to provide one or more response messages comprising the requested parameters; and means for transmitting an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device.

In yet another implementation, an apparatus may comprise a communication interface coupled to a receiver of a mobile device to communicate with an electronic communications network and one or more processors coupled to a memory and to the communication interface, the communication interface and the one or more processors configured to receive a location request message requesting parameters indicative of a location of the mobile device, the location request message specifying one or more timer values by which the mobile device is to provide one or more response messages comprising the requested parameters; and transmit an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device.

In yet another implementation, an article may comprise a non-transitory storage medium having instructions executable by a processor to receive a location request message requesting parameters indicative of a location of a mobile device, the location request message specifying one or more timer values by which the mobile device is to provide one or more response messages comprising the requested parameters; and transmit an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, and/or articles of manufacture are disclosed herein that may be implemented, in whole or in part, to facilitate and/or support one or more operations and/or techniques for handling an early position fix for LPP-type positioning sessions for use in or with mobile communication devices. In this context, "LPP positioning session" refers to one or more procedures and/or protocols that may be used, in whole or in part, for positioning of one or more mobile communication devices in connection with a location server via an exchange of messages. In some instances, messages may include, for example, one or more communication sequences regarding capability exchange and/or transfer, assistance data exchange and/or transfer, location information transfer, etc., or any combination thereof. As a way of illustration, at times, an LPP-type positioning session may include, for example, a session providing one or more extensions for OTDOA or like positioning, such as an LPPe positioning session, though claimed subject matter is not so limited.

As used herein, an "early" position fix refers to a position fix (e.g., if computed via a mobile communication device, etc.) and/or position measurements (e.g., if communicated for computing a position fix via a location server, etc.) available earlier in a positioning session, such as prior to expiration of a maximum response time specified by a location server via a quality of service (QoS) parameter. In some instances, an early position fix and/or position measurements may, for example, be reported to a location server, such as while a mobile communication device continues searching for and/or measuring signals from applicable wireless transmitters for its final report (e.g., a final location information message, etc.). Particular examples of LPP-type positioning sessions, location information, messages, procedures, protocols, QoS parameters, or the like will be described in greater detail below. It should be noted that even though the discussion throughout the specification primarily references particular signals, protocols, networks, etc., such as, for example, for OTDOA in 4G Long Term Evolution (LTE), such as for ease of description, any other suitable signals, protocols, networks, etc., such as 1× signals for Advanced Forward Link Trilateration (AFLT) in Code Division Multiple Access (CDMA), enhanced Cell ID (E-CID), and/or Wi-Fi positioning (e.g., based on downlink signals according to IEEE 802.11x standards, etc.), positioning for short range nodes (SRNs), such as Bluetooth® Low Energy (BTLE) beacons, satellite positioning system (SPS) signals, or the like may also be utilized herein, in whole or in part, such as instead of or in addition to OTDOA positioning in a similar or like fashion and/or without deviating from the scope of claimed subject matter.

As used herein, "mobile device," "mobile communication device," "location-aware mobile device," or like terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heat map generation tools, or the like. It should be appreciated, however, that these are merely examples of mobile devices that may be used, at least in part, to implement one or more operations and/or techniques for handling an early position fix for LPP-type positioning sessions, and that claimed subject matter is not limited in this regard. It should also be noted that the terms "position" and "location" may be used interchangeably herein.

As alluded to previously, at times, a position fix of a mobile device, such as a cellular telephone, for example, may be obtained based, at least in part, on information gathered from various systems. One such system may comprise, for example, an OTDOA positioning system. In this system, a server may facilitate and/or support positioning of a mobile device by providing positioning assistance data as well as computing and/or verifying (e.g., if computed at a mobile device, etc.) a position fix using one or more specific signals, referred to as reference signals. Namely, a mobile device may, for example, measure a time difference between reference signals received from a reference wireless transmitter and one or more neighbor wireless transmitters positioned at known locations. In this context, a "wireless transmitter" refers to any suitable device capable of transmitting and/or receiving wireless signals, such as via an integrated or associated receiver and/or transmitter, for example. As a way of illustration, a wireless transmitter may comprise, for example, a cellular base station, wireless local area network (WLAN) access point, radio beacon, femtocell, picocell, mobile device, or the like. A mobile device may then compute its position fix, such as using obtained position measurements or, optionally or alternatively, may report these measurements and/or a position fix to a suitable location server, such as, for example, an Enhanced Serving Mobile Location Center (E-SMLC), a Secure User Plane Location (SUPL) Location Platform (SLP), or the like. In turn, with knowledge of locations of measured wireless transmitters, an E-SMLC, SUPL, or like server may, for example, compute a position fix of a mobile device, if applicable, using measured time differences and relative transmission timing, such as via one or more appropriate multilateration techniques, and may communicate the computed position fix to a mobile device of interest.

As was also indicated, at times, one or more operations and/or techniques for handling an early position fix for LPP-type positioning sessions may also be implemented, at least in part, in connection with one or more other positioning approaches, such as those utilizing measurements of time differences of signals received from a number of wireless transmitters, for example. Thus, in some instances, one or more operations and/or techniques discussed herein may be utilized, at least in part, in connection with, for example, AFLT used for locating a mobile device on a CDMA2000 network, as defined by the 3rd Generation Partnership Project 2 (3GPP2). Similarly to OTDOA, AFLT positioning may, for example, make use of information for measured wireless transmitters to help a mobile device, such as via AFLT assistance data to acquire and/or measure applicable reference signals for purposes of computing a position fix based, at least in part, on these measurements. Depending on an implementation, information may include, for example, locations (e.g., coordinates, etc.), transmission characteristics (e.g., timing, power, signal content, signal characteristics, etc.) of measured wireless transmitters, such as referred to as an almanac, a base station almanac (BSA), almanac data or BSA data, etc. Thus, at times, observed time differences measured by a mobile device (e.g., in connection with OTDOA, AFLT, etc.) may, for example, be used, at least in part, in conjunction with a BSA for measured wireless transmitters to calculate a position fix of a mobile device, such as at or by a location server (e.g., an E-SMLC, SLP, etc.), mobile device, or any combination thereof.

Continuing with the above discussion, to facilitate and/or support one or more operations and/or techniques for handling an early position fix for LPP-type positioning sessions, one or more wireless transmitters on a network may broadcast a positioning reference signal (PRS) that may be distinct from one or more PRS broadcasted by other nearby wireless transmitters due, at least in part, to a use of a different frequency, different encoding, different times of transmission, or the like. A mobile device may measure PRS transmitted by a reference wireless transmitter and a proximate or neighbor wireless transmitter and may obtain, for example, a time of arrival (TOA) and/or a reference signal time difference (RSTD) measurement. In this context, "RSTD" refers to one or more position measurements indicative of a difference in time of arrival between a PRS transmitted by a measured wireless transmitter, referred to herein as a "neighbor wireless transmitter," and a PRS transmitted by a reference wireless transmitter. A reference wireless transmitter may be selected by a location server (e.g., an E-SMLC, SLP, etc.), mobile device, or a combination thereof so as to provide good or otherwise sufficient signal strength observed at a receiver of the mobile device, such that a PRS can be more accurately and/or more quickly acquired and/or measured, such as without any special assistance from a serving network, for example.

At times, such as during an LPP-type positioning session, for example, a mobile device may be provided with positioning assistance data by a serving network (e.g., via a location server, etc.) to assist in a PRS acquisition and/or measurement, as was also indicated. For example, at times, a location server may provide to a mobile device positioning assistance data, such as OTDOA assistance data, as one example, listing one or more neighbor wireless transmitters capable of transmitting a PRS. In some instances, OTDOA assistance data may include, for example, identities, center frequencies, etc. of wireless transmitters, one or more predicted RSTD values, such as expected RSTD and/or expected RSTD uncertainty values, or the like. Assistance data may also include, for example, an identity of a reference wireless transmitter, frequency for a reference PRS signal, reference PRS code sequence, reference PRS transmission times, or the like. In some instances, assistance data may also specify one or more QoS parameters, which may also be used, at least in part, in connection with searching a PRS and/or measuring RSTD. For example, in some instances, a QoS parameter may comprise a desired accuracy of a location estimate and/or a maximum response time for measuring TOA and/or providing RSTD measurements to a location server, which a mobile device and/or server may take into account, such as while implementing one or more OTDOA positioning operations.

A mobile device may then typically measure a PRS (e.g., a TOA for a PRS, etc.) for one or more neighbor wireless transmitters, such as by integrating a received signal at a neighbor wireless transmitter carrier frequency, for example, in accordance with provided assistance data (e.g., a PRS frequency, etc.) and a QoS parameter (e.g., a maximum response time, etc.). For example, based, at least in part, on received assistance data and/or a QoS parameter, a mobile device may be capable of determining a number of neighbor wireless transmitters to be searched (e.g., for acquisition of a PRS, etc.) in an effective and/or efficient manner, an order and/or duration of a particular PRS search, dynamic time frame for responding with RSTD measurements, whether greater accuracy or faster time-to-first fix (TTFF) is desired for an optimum or otherwise suitable position fix, or the like. Having measured PRS, a mobile device may perform RSTD measurements, such as utilizing provided assistance data, for example, and may report RSTD measurements to a location server, such as prior to expiration of a maximum response time specified by the server via a QoS parameter.

In some instances, such as if a positioning session is implemented via one or more 3GPP Release 12 or like standards and/or protocols, for example, a QoS parameter may comprise an information element (IE) with two timer values (e.g., in the range 1 to 128 seconds), such as specifying an early response timeout and a final response timeout. Typically, these timeouts may, for example, be measured from receipt of a request location information message from a location server and transmission of a particular response message from a mobile device, such as with an applicable position fix and/or measurements. For example, a timer value for an early response timeout may specify a time by which a mobile device should return an early position fix and/or measurements to a location server, and a timer value for a final response timeout may specify a time by which a final position fix and/or measurements should be returned. As was indicated, in some instances, having two timer values may, for example, allow a mobile device to communicate its position fix and/or measurements that may be available earlier in a positioning session, such as prior to expiration of a maximum response time. A mobile device may subsequently supplement this early position fix and/or measurements, which may comprise less accurate location information, for example, with a final position fix and/or measurements, which may comprise more accurate location information, such as once the final position fix/or measurements are available.

As a way of illustration, at an early response timeout, a mobile device may, for example, transmit a response message (e.g., a ProvideLocationInformation message, etc.) with an early position fix and/or measurements, such as if at least one of requested OTDOA or like measurements (e.g., TOA, RSTD, etc.) has been obtained. In some instances, such as if a mobile device has a larger number of neighbor wireless transmitters to be searched and/or measured, for example, then multiple response messages may be transmitted to a location server, as was indicated. As will be seen, for a response message with an early position fix and/or measurements, a mobile device may, for example, utilize an embedded flag, such as "MoreMessagesOnTheWay," as one possible example, such as to indicate to a location server that one or more subsequent messages are expected to have additional location information. In such a case, at times, a location server may, for example, refrain from computing and/or providing to a mobile device of interest a position fix upon receipt of initial location information and may wait for additional location information from the mobile device. Optionally or alternatively, a location server may utilize an early position fix and/or measurements to compute and/or obtain a rough position fix of a mobile device, such as for purposes of routing caller location information to an appropriate Public Safety Answering Point (PSAP), for example. At a final response timeout, which may correspond to a maximum response time, for example, a mobile device may transmit a final report with a final position fix and/or measurements via an appropriate message, if applicable. Here, a mobile device may, for example, embed a flag "NoMoreMessages" into such a message, such as to indicate to a location server the end of messages with location information. A location server may subsequently compute and/or provide a position fix to a mobile device of interest, as was also discussed. Claimed subject matter is not limited to particular messages, flags, etc., of course.

As alluded to previously, an early position fix and/or measurements may, for example, be useful to assist routing to a PSAP or like entity, such as for purposes of timely initiating and/or implementing an E911 OTDOA or like positioning session, as one possible example. For example, based, at least in part, on a transmitted early position fix and/or measurements, a PSAP operator may be capable of determining a rough or approximate location of an emergency caller and may timely initiate a process of emergency dispatch. In some instances, an early position fix and/or measurements may, for example, also be useful to an entity (e.g., a wireless service provider, etc.) that would like to improve on a longer response time during an applicable part of a positioning session, such as while using Assisted GPS (A-GPS), Assisted GNSS (A-GNSS), or like positioning approaches in which a first (e.g., less accurate, etc.) position fix and/or measurements may be sufficient for a process to start (e.g., prepare appropriate map data, etc.) and then proceed further (e.g., update the map data, etc.) once a final (e.g., more accurate, etc.) position fix and/or measurements are available. Again, these are merely details relating to applicability and/or usefulness of an early position fix and/or measurements, and claimed subject matter is not so limited.

Currently, a typical positioning session using one or more 3GPP Release 12 or like standards and/or protocols, such as implemented in connection with searching and/or measuring a PRS, for example, may be less effective and/or efficient due, at least in part, to a lack of a criteria or mandate, regulatory or otherwise, with respect to setting a timer value for an early response time, which makes it open to interpretation. For example, here, a location server may not be aware of when and/or whether a particular mobile device may be capable of obtaining an early position fix and/or measurements, when and/or whether a more accurate position fix and/or measurements so as to fulfill desired QoS criteria for a final report may be available, or the like. This may, for example, be due, at least in part, to a lack of awareness on the part of a location server with respect to a mobile device's current location, and, thus, its associated signal environment, signal conditions, or the like. As such, at times, a mobile device located within a particular environment may be in a better position, such as in relation to a remote location server, for example, to estimate and/or determine when and/or whether additional location information may be available.

Thus, due, at least in part, to a lack of awareness with respect to a particular signal environment and/or signal conditions, in some instances, determining and/or setting timer values by a location server may be relatively static (e.g., 5.0 seconds for an early response timeout and 20.0 seconds for a final response timeout, etc.) and may be rather uniformly applied across a variety of applications, systems, and/or environments. In certain simulations or experiments, however, it has been observed that in a challenging environment, such as deeper indoors, denser urban areas, etc., for example, a mobile device may not be able to perform at least some of requested measurements (e.g., GNSS, OTDOA, etc. measurements) within an early response timeout specified by a location server. Thus, in conditions where a mobile device might be close to acquiring requested measurements a few seconds after a specified early timeout, but still much earlier than a final timeout, for example, the mobile device may have no or little ability to transmit these measurements until a final report. Here, a mobile device may, for example, report a location error, meaning that it may not be possible for a location server to obtain an early position fix and/or measurements, which, in turn, may delay location estimation and/or reporting to a PSAP or other entity. Accordingly, it may be desirable to develop one or more methods, systems, and/or apparatuses that may enhance and/or improve OTDOA or like positioning, such as implemented in connection with one or more 3GPP Release 12 or like standards and/or protocols, for example, via accounting for a particular signal environment and/or signal conditions associated with a mobile device.

Thus, as will be discussed in greater detail below, in an implementation, a mobile device may receive two timer values specifying an early and a final response timeouts, such as during a 3GPP Release 12 or like positioning session, for example, may search for and/or measure signals from a number of wireless transmitters, and may transmit an initial response message at the expiration of the early timeout value. In some instances, an initial response message may comprise, for example, at least an initial portion of parameters requested by a location server (e.g., via a RequestLocation Information message, etc.) and indicative of a location of a mobile device. To illustrate, a location server may, for example, request a mobile device to provide OTDOA and GNSS measurements. As was previously discussed, in a challenging environment (e.g., deeper indoors, denser urban areas, etc.), however, certain requested parameters, such as GNSS measurements, for example, may be unavailable. Here, instead of reporting a location error, as may be the case in a typical LPP positioning session, a mobile device may, for example, transmit an initial response message that includes requested OTDOA measurements but no requested GNSS measurements. An initial response message may also include a flag or like IE to indicate to a location server that one or more subsequent messages are expected to provide additional location parameters, such as GNSS measurements that were not included in the initial response message, for example, as will also be seen.

Continuing with the above example, having transmitted an initial response message, a mobile device may, for example, continue to search for GNSS signals to measure, such as until a new response timeout. In some instances, a new response timeout may, for example, be determined and/or set by a mobile device, rather than a location server, and may be based, at least in part, on a particular signal environment, signal conditions, etc. associated with the mobile device. As also discussed below, a new response timeout may be determined dynamically and may comprise, for example, a timer value shortly after the expiration of an early response timeout but well prior to the expiration of a final response timeout, just to illustrate one possible implementation. By way of example but not limitation, a new response timeout may comprise, for example, a timer value between 2.0 and 5.0 seconds after the expiration of an early response timeout, which may depend, at least in part, on sensory, radio signal, or some other information present on and/or communicated to a mobile device, though, again, claimed subject matter is not so limited. Any other suitable timer value may be used herein, which may depend, at least in part, on a signal environment, signal conditions, mobile device, positioning session, signaling standard and/or protocol, or the like. A mobile device may subsequently obtain GNSS measurements, if available, and may, for example, transmit another message with these additional location parameters, such as prior to or at the expiration of a new response timeout. This message may also include a flag or like IE to indicate to a location server that no more subsequent messages with location parameters are expected.

In some instances, a subsequent message may include, as a way of recommendation, a new response timeout, such as, for example, determined for a particular area based, at least in part, on associated signal environment, signal conditions, or the like. A location server may then specify this timeout as a value for responding with an early position fix and/or measurements, for example, such as in a location request message transmitted by the server to one or more applicable mobile devices that may be located in and/or proximate to that particular area. In some instances, such as if additional location parameters that were not included in an initial response message, such as GNSS measurements, for example, are not available within a timeframe specified via a new response timeout, a mobile device may report a location error with respect to these location parameters (e.g., GNSS measurements, etc.) and may transmit a message indicating that no more subsequent messages with location parameters are expected during this positioning session. At times, instead of specifying two particular timer values, a location server may, for example simply request a mobile device to provide early and final location information once available, such as via appropriate "wildcard" timer values or IEs, for example, as will also be seen.

FIG. 1 is a schematic diagram illustrating features associated with an implementation of an example operating environment 100 capable of facilitating and/or supporting one or more processes and/or operations for handling an early position fix for LPP-type positioning sessions for use in or with a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), WWAN, wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points (e.g., WLAN, etc.), radio beacons, cellular base stations, femtocells, or the like, depending on an implementation. Similarly, local transceiver 112 may comprise, for example, a wireless transmitter and/or receiver capable of transmitting and/or receiving wireless signals. For example, at times, wireless transceiver 112 may be capable of obtaining one or more signal-related observations, such as signals strength, time delay, etc. from one or more other terrestrial transmitters.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.), wireless personal area network (WPAN, e.g., Bluetooth® network, etc.), or like local area networks. For example, in another example implementation, local transceiver 112 may comprise a femtocell or picocell capable of facilitating communication via link 114 according to an applicable cellular or like wireless communication protocol. Of course, it should be understood that these are merely examples of networks that may communicate with mobile device 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124. Network 122 may comprise, for example, any combination of wired or wireless communication links. In a particular implementation, network 122 may comprise, for example, Internet Protocol (IP)-type infrastructure capable of facilitating or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate and/or support mobile cellular communication with mobile device 102. As was indicated, in some instances, network 122 may facilitate and/or support communications with a Public Safety Answering Point (PSAP) (not shown) or like entity, such as for purposes of initiating and/or implementing an E911 OTDOA positioning session, for example. Servers 116, 118, and/or 120 may comprise any suitable servers or combination thereof capable of facilitating or supporting one or more operations or techniques discussed herein. For example, servers 116, 118, and/or 120 may comprise one or more location servers (e.g., Evolved Serving Mobile Location Server (E-SMLC), Secure User Plane Location Server/SUPL Location Platform (SUPL SLP), etc.), positioning assistance servers, navigation servers, map servers, crowdsourcing servers, network-related servers, or the like.

In particular implementations, and as also discussed below, mobile device 102 may have circuitry or processing resources capable of determining a position fix or estimated location of mobile device 102, rough or otherwise. For example, if satellite signals 104 are available, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples. If satellite signals 104 are not available, mobile device 102 may, for example, compute a position fix based, at least in part, on Cell ID, enhanced Cell ID, or like positioning.

In some implementations, mobile device 102 may obtain a position fix by processing wireless signals received from one or more terrestrial transmitters positioned at known locations (e.g., base station transceiver 108, local transceiver 112, etc.) using any one of several techniques, such as, for example, OTDOA, AFLT, or the like. In these techniques, a range from mobile device 102 may, for example, be measured to three or more of terrestrial transmitters based, at least in part, on one or more reference signals (e.g., PRS, etc.) transmitted by these transmitters and received at mobile device 102, as was indicated. Here, servers 116, 118, or 120 may be capable of providing positioning assistance data to mobile device 102 including, for example, OTDOA reference transmitter data, OTDOA neighbor transmitter data, PRS configuration data, RSTD search window, QoS parameters, locations, identities, orientations, etc. of terrestrial transmitters to facilitate and/or support one or more applicable positioning techniques (e.g., AFLT, OTDOA, etc.). At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As alluded to previously, in particular environments, such as deeper indoor or like environments (e.g., urban canyons, etc.), mobile device 102 may not be capable of acquiring or processing signals 104 from a sufficient number of SPS satellites 106 so as to perform a suitable positioning technique. Thus, optionally or alternatively, mobile device 102 may be capable of determining a position fix based, at least in part, on signals acquired from one or more local transmitters, such as femtocells, WLAN access points, or the like. For example, mobile device 102 may obtain a position fix by measuring ranges to three or more local transceivers 112 positioned at known locations. In some implementations, mobile device 102 may, for example, measure ranges by obtaining a MAC address from local transceiver 112, as was indicated.

In an implementation, mobile device 102 may, for example, receive positioning assistance data (e.g., OTDOA, AFLT assistance data, etc.) for one or more positioning operations from servers 116, 118, and/or 120. At times, positioning assistance data may include, for example, locations, identities, orientations, etc. of one or more local transceivers 112, base station transceivers 108, etc. positioned at known locations for measuring ranges to these transmitters based, at least in part, on an RTT, TOA, TDOA, etc., or any combination thereof. In some instances, positioning assistance data to aid positioning operations may include, for example, radio heat maps, context parameter maps, routeability graphs, positioning tiles, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

According to an implementation, mobile device 102 may access navigation assistance data via servers 116, 118, and/or 120 by, for example, requesting such data through selection of a universal resource locator (URL). In particular implementations, servers 116, 118, and/or 120 may be capable of providing navigation assistance data to cover many different areas including, for example, floors of buildings, wings of hospitals, terminals at an airport, portions of a university campus, areas of a large shopping mall, etc., just to name a few examples. Also, if memory or data transmission resources at mobile device 102 make receipt of positioning assistance data for all areas served by servers 116, 118, and/or 120 impractical or infeasible, a request for such data from mobile device 102 may, for example, indicate a rough or course estimate of a location of mobile device 102. Mobile device 102 may then be provided navigation assistance data covering, for example, one or more areas including or proximate to a roughly estimated location of mobile device 102. In some instances, one or more servers 116, 118, and/or 120 may facilitate and/or support searching for PRS from one or more applicable wireless transmitters (e.g., local transceiver 112, base station transceiver 108, etc.) and/or performing RSTD or like measurements, such as for determining a position fix in connection with an E911 OTDOA positioning session, for example, and may provide the position fix to an applicable PSAP via network 122.

Even though a certain number of computing platforms and/or devices are illustrated herein, any number of suitable computing platforms and/or devices may be implemented to facilitate and/or support one or more techniques or processes associated with operating environment 100. For example, at times, network 122 may be coupled to one or more wired or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate and/or support femtocell-based operative regions of coverage, for example. Again, these are merely example implementations, and claimed subject matter is not limited in this regard.

Figure 2:
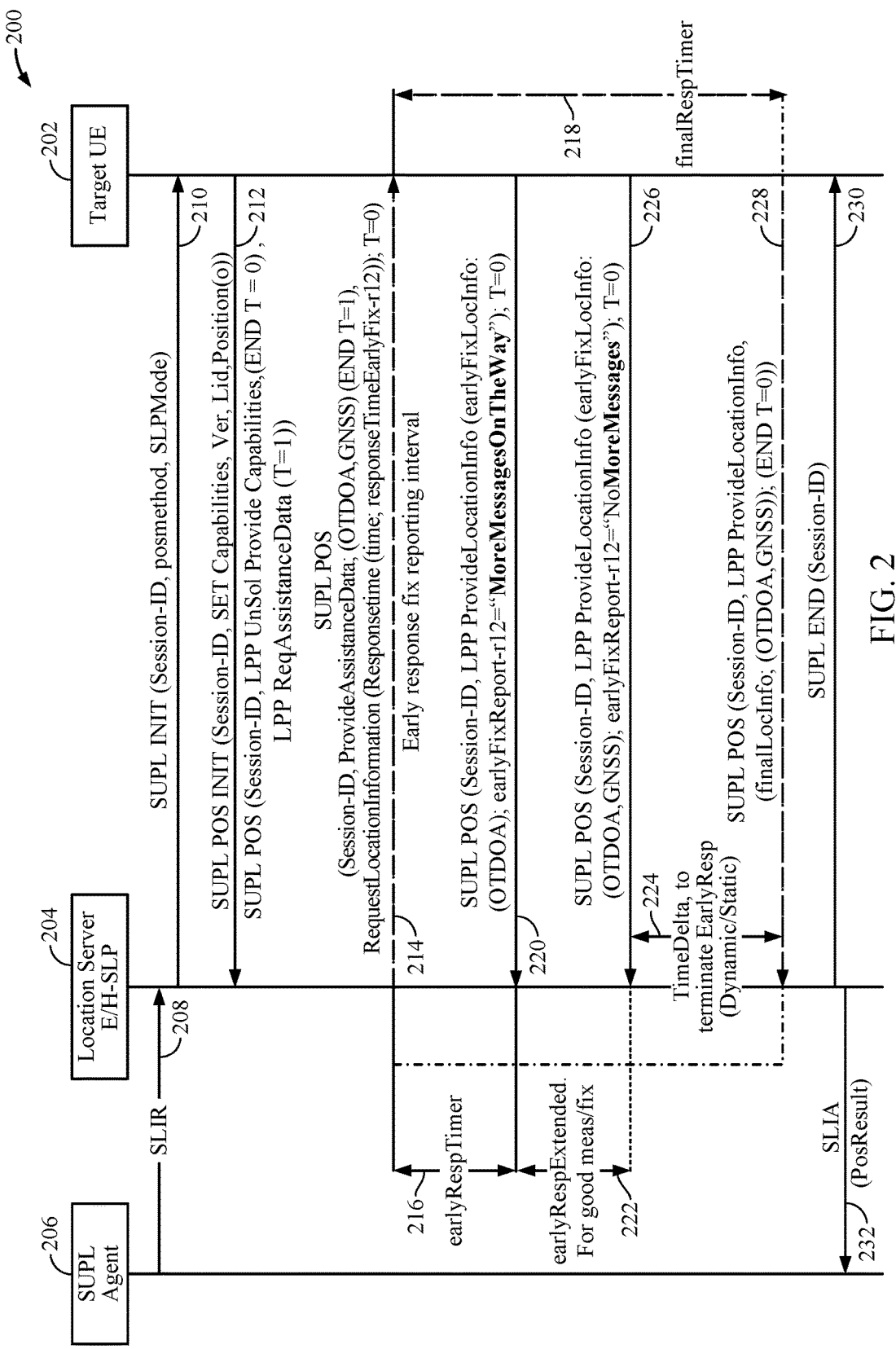
FIG. 2 is a message flow diagram illustrating an implementation of an example message exchange process for handling an early position fix for LPP-type positioning sessions.

Referring now to FIG. 2, which is a message flow diagram illustrating an implementation of an example message exchange process 200 between a mobile device 202, illustrated for this example as a target user equipment (UE), and a location server 204, illustrated for this example as an Emergency SUPL Location Platform (E-SLP) and/or Home SLP (H-SLP), that may facilitate and/or support one or more operations and/or techniques for handling an early position fix for LPP-type positioning sessions. As was indicated, even though process 200 illustrates OTDOA positioning using an LPP session, claimed subject matter is not limited in this regard, and any other suitable positioning session, technique, protocol, etc. may be used herein, in whole or in part. For example, in some instances, an LPPe, LPP/LPPe, RRC protocol (e.g., as defined in 3GPP TS 36.331, etc.), IS-801 protocol (e.g., as defined in 3GPP2 TS C.S0022, etc.), or the like may also be employed herein, in whole or in part. At times, one or more operations and/or techniques for handling an early position fix for LPP-type positioning sessions may, for example, be implemented via OTDOA positioning for UMTS access, Enhanced Observed Time Difference (E-OTD) for GSM or AFLT, or the like.

In addition, a downlink signal that is measured by mobile device 202 in connection with one or more operations and/or techniques for handling an early position fix may not be a PRS, such as discussed herein and/or currently defined by 3GPP, for example, but some other downlink reference signal or pilot signal (e.g., a common reference signal for LTE, etc.). Also, measurements of a downlink signal may not be of RSTD, such as also discussed herein and/or defined by 3GPP, for example, but instead of some other suitable quantity and/or phenomena, such as TOA, angle of arrival (AOA), received signal strength (e.g., RSSI), return trip time (RTT), signal-to-noise (S/N) ratio, or the like. Thus, although one or more applicable positioning techniques, protocols, measured quantities, etc. may differ, a message exchange utilizing one or more reference signals and/or pilot signals, such as in connection with handling an early position fix, as discussed herein, for example, may be the same as or similar to that described for process 200. It should also be noted that claimed subject matter is not limited to a particular mobile device, location server, and/or plane. For example, one or more operations and/or techniques for handling an early position fix for LPP-type positioning sessions may be implemented, in whole or in part, via a user plane or via a control plane.

At times, process 200 may, for example, be implemented, at least in part, within operating environment 100 of FIG. 1. Thus, in some instances, mobile device 202 may comprise or be representative of mobile device 102 of FIG. 1, for example, and server 204 may comprise or be representative of server 116, 118, and/or 120 of FIG. 1, for example. In some instances, mobile device 202 may comprise, for example, a SUPL Enabled Terminal (SET), and server 204 may comprise, for example, a SUPL Location Platform (SLP), such as an H-SLP, E-SLP, or D-SLP, just to illustrate a few possible implementations. It should be noted that information acquired and/or produced, such as input signals, output signals, operations, results, messages, etc. associated with process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

At times, positioning of mobile device 202 may be facilitated and/or supported via an exchange of LPP messages, as one possible example, between mobile device 202 and server 204 via any suitable communications network, such as network 122 of FIG. 1, for example, via one or more wireless transmitters, such as base station transceiver 108, local transceiver 112 of FIG. 1, etc., or a combination thereof. As was indicated, in some instances, process 200 may, for example, be used, at least in part, to facilitate and/or support OTDOA or like (e.g., E911, etc.) positioning for 3GPP Release 12 or the like, such as with one or more initial or early position fixes and/or measurements followed by a subsequent or final position fix and/or measurements. As will also be seen, at times, process 200 may be used, at least in part, to obtain a relatively faster and/or more accurate TTFF of mobile device 202, such as via timely reporting a number of available position fixes and/or measurements, if applicable, while abiding by timeout requirements of 3GPP Release 12 or the like. In some instances, process 200 may, for example, be used, at least in part, to ensure that early responses do not interfere with a final timeout, which may enhance a current PRS search strategy in 3GPP, for example. Again, it should be noted that process 200 is not limited to indoor implementations. For example, at times, process 200 may be performed, at least in part, in an indoor-like environment, which may include partially or substantially enclosed areas, such as urban canyons, town squares, amphitheaters, parking garages, rooftop gardens, patios, or the like. In some instances, process 200 may, for example, be performed, at least in part, in an outdoor environment.

Thus, as illustrated, in some instances, process 200 may be initiated via a suitable entity, such as a SUPL Agent, as one possible example, referenced generally at 206, issuing a standard location immediate request (SLIR) message 208 to location server 204, just to illustrate one possible implementation to which claimed subject matter is not limited. For example, at times, message 208 may comprise a mobile location protocol (MLP) emergency immediate location request message, such as initiated in connection with an E911 or like positioning session, as was indicated. It should be noted that even though SUPL Agent 206 is illustrated as a separate entity, in some instances, SUPL Agent 206 may, for example, comprise and/or reside on mobile device 202, such as hardware and/or software to facilitate and/or support SET initiated services, etc. Having received message 208, location server 204 may initiate a positioning session, such as a SUPL session, for example, by transmitting a SUPL INIT message 210 (e.g., with session ID, etc.) to mobile device 202. In response, mobile device 202 may, for example, establish a secure connection with location server 204, if applicable, and may transmit a SUPL POS INIT message 212, which may include capabilities of mobile device 202 (e.g., supported modes, frequency bands, etc.), positioning protocol payload (e.g., for LPP/LPPe, etc.), or the like.

As illustrated at 214, location server 204 may request parameters indicative of a location of mobile device 202 by transmitting an LPP Request Location Information message, such as encapsulated in a SUPL POS message 214, for example. As was indicated, in some instances, such as for 3GPP Release 12 or like specification and/or technology, SUPL POS message 214 may specify two timer values (e.g., via a QoS parameter, etc.), such as with a timeout for an early response, referenced generally at 216, and a timeout for a final response, referenced generally at 218. Depending on an implementation, location server 204 may, for example, request parameters indicative of a location of mobile device 202 to facilitate and/or support A-GNSS, E-CID, OTDOA, E911, or like positioning. For example, in at least one implementation, location server 204 may request mobile device 202 to provide OTDOA and GNSS measurements, though claimed subject matter is not so limited. As was previously discussed, in a challenging environment (e.g., deeper indoors, denser urban areas, etc.), however, certain requested parameters, such as GNSS measurements, for example, may be unavailable. Here, at the expiration of an early timeout, instead of reporting a location error, as was also discussed previously, mobile device 202 may, for example, respond with transmitting an initial or early Provide Location Information message, such as encapsulated in a SUPL POS message 220, for example. As seen, message 220 may comprise requested OTDOA measurements but no requested GNSS measurements, for example. As also illustrated, at times, message 220 may include, for example, a "MoreMessagesOnTheWay" flag or like IE, such as to indicate to location server 204 that one or more subsequent messages are expected to provide additional location information (e.g., GNSS measurements, etc.).

Continuing with the above example, in an implementation, having transmitted initial response message 220, mobile device 202 may continue to search for additional location parameters, such as GNSS measurements that were requested by location server 204 but were not included in message 220, for example, until a new response timeout, illustrated generally at 222. As was indicated, this new response timeout may, for example, be defined and/or set via an appropriate timer value (e.g., a number of seconds from an early response timeout, etc.) by mobile device 202, rather than location server 204, since mobile device 202 may be in a better position to estimate and/or determine when and/or whether additional location information, such as requested GNSS measurements, for this example, may be available. Mobile device 202 may, for example, utilize an electronic digital map of an associated area and/or some other information (e.g., on-board sensors, etc.) to determine that, based, at least in part, on its last known location and/or moving trajectory, mobile device 202 may be capable of obtaining requisite GNSS measurements some time (e.g., a few seconds, etc.) later after an early response timeout, but well before a final timeout specified by location server 204. This determination may, for example, be based, at least in part, on a current and/or anticipated GNSS signal environment (e.g., whether a mobile device is indoors, outdoors, going into a tunnel, etc.), current and/or anticipated radio signal environment (e.g., LTE reference signal received power, reference signal received quality, etc.), current and/or anticipated motion environment, or the like. For example, this or like information may help a mobile device to determine whether it is moving towards or away from a particular wireless transmitter (e.g., an LTE cellular base station, etc.) and/or a cluster of wireless transmitters (e.g., a cluster of LTE cellular base stations, etc.), whether a mobile device is moving in general (e.g., via an inertial sensor, etc.), whether a mobile device is on-board of a vehicle or in a walking user's pocket (e.g., via an accelerometer, etc.), whether a mobile device is going into a brighter or darker area (e.g., via a visible light control intensity sensor, etc.), or the like.

Thus, a timer value for a new response timeout may, for example, be determined, at least in part, experimentally and/or may be set, for example, and/or otherwise dynamically determined by mobile device 202 depending, at least in part, on a signal environment and/or signal conditions, mobile device, positioning session, signaling standard and/or protocol, or the like. By way of example but not limitation, in one particular simulation or experiment, it appeared that a timer value for a new response timeout between 2.0 and 5.0 seconds, such as measured from the expiration of an early timeout value, for example, may prove beneficial for handling an early position fix for LPP-type positioning sessions. Claimed subject matter is not so limited, of course. For example, in some instances, a new response timeout may be determined and/or set as a time delta, such as a timer value set to expire a certain number of seconds from an early response timeout, as referenced generally at 222, or a timer value set to expire a certain number of seconds prior to a final timeout, as referenced generally at 224, just to illustrate a few possible implementations. Again, details relating to a new response timeout are merely examples to which claimed subject matter is not limited.

According to an implementation, mobile device 202 may continue to search for and may obtain requested parameters, such as GNSS measurements, for example, and may transmit these parameters via a subsequent SUPL POS message, referenced herein at 226, such as prior to or at the expiration of a new timeout. As seen, in at least one implementation, message 226 may also comprise additional and/or updated OTDOA measurements, if available, such as to facilitate and/or support a better quality and/or more accurate position fix, for example. Updated OTDOA measurements may comprise, for example, measurements with higher signal quality, such as represented via RSRP and/or RSPQ values, just to illustrate a few possible examples. As seen, message 226 may also include a "NoMoreMessages" flag or like IE, such as to indicate to location server 204 that no more subsequent messages with location information are expected. In some instances, message 226 may also include, as a way of recommendation, a timer value for a new timeout, such as, for example, determined for a particular area based, at least in part, on associated signal environment and/or signal conditions, as was indicated. Location server 204 may then specify this timeout via a corresponding timer value for an early position fix and/or measurements in a location request message transmitted to one or more applicable mobile devices that may be located in and/or proximate to that particular area, for example, such as for one or more subsequent positioning sessions. In some instances, such as if additional location parameters that were not included in an initial response message (e.g., GNSS measurements, etc.) are still not available within a timeframe of a new timeout, for example, mobile device 202 may report a location error by transmitting an appropriate message (not shown) with a flag or like IE indicating that no more subsequent messages with location parameters are expected (e.g., a "NoMoreMessages" flag, etc.).

In an implementation, after transmitting additional location information (e.g., OTDOA, GNSS, etc. measurements) via message 226, mobile device 202 may, for example, proceed with obtaining and/or reporting a final position fix and/or measurements, such as prior to or at the expiration of final timeout 218. A final position fix and/or measurements may, for example, be reported via a SUPL POS message 228, which, at times, may comprise location parameters of the same type as returned via message 220 and/or message 226 (e.g., OTDOA, GNSS, etc. measurements). In some instances, location parameters in message 228 may comprise, for example, one or more additional and/or updated location parameters, if available, such as to facilitate and/or support a better quality and/or more accurate position fix of mobile device 202. For example, as was indicated, mobile device 202 may be capable of obtaining a more accurate position fix using more recent GNSS pseudorange measurements, if available, and/or OTDOA measurements from stronger wireless transmitters (e.g., with higher signal strength, etc.), if also available. Thus, at times, a final position fix and/or measurements in message 228 may, for example, be more accurate than an early position fix and/or measurements, such as transmitted via message 220, 226, or the like. A final position fix and/or measurements may, for example, be included in an LPP Provide Location information message that is encapsulated in SUPL POS message 228, as one possible example.

As was indicated, in at least one implementation, instead of specifying two particular timer values, such as for early timeout 216 and final timeout 218, for example, location server 204 may simply request mobile device 202 to provide early and final location information once available (e.g., as soon as possible, etc.), but within a certain timeframe set not to exceed a maximum response time. For this example, location server 204 may, for example, set early timeout 216 as a "wild card" value or IE (e.g., an asterisk, etc.), thus, leaving an implementation decision with respect to timing of transmitting an early position fix and/or measurements to mobile device 202. At times, such as instead of employing a "wild card" value or IE, location server 204 may, for example, set a timer value for early timeout 216 as or equal to a timer value for final timeout 218, again, to indicate that a decision with respect to timing of transmitting an early position fix and/or measurements is left to mobile device 202. Mobile device 202 may then utilize these one or more values or IEs to make a determination when and/or whether to transmit early response message 220, 226, etc. in a similar fashion, which may, for example, be based, at least in part, on signal environment, signal conditions, positioning session, desired QoS criteria, etc., as was indicated. Mobile device 202 may also recommend a new response timeout, as also discussed above, for example, which location server 204 may then specify in one or more location request messages to one or more applicable mobile devices.

According to an implementation, after receiving message 228, location server 204 may, for example, terminate a current positioning session by sending an appropriate message, such as SUPL END message 230, as one possible example, to mobile device 202. Here, mobile device 202 may, for example, release a secure connection to server 204, if applicable. Location server 204 may then transmit a position estimate back to SUPL Agent 206, such as via a SLIA message 232, just to illustrate one possible implementation. Again, claimed subject matter is not limited. For example, in some instances, message 232 may comprise an MLP Emergency Immediate Location Report message, such as if example process 200 is implemented, at least in part, in connection with an E911 or like positioning session. As such, as illustrated, in some instances, example process 200 may enhance a current PRS search strategy in 3GPP, such as to facilitate and/or support a relatively faster and/or more accurate TTFF of mobile device 202, for example, while abiding by timeout requirements of 3GPP, ensuring that early responses do not interfere with a final timeout, or the like.

Figure 3:
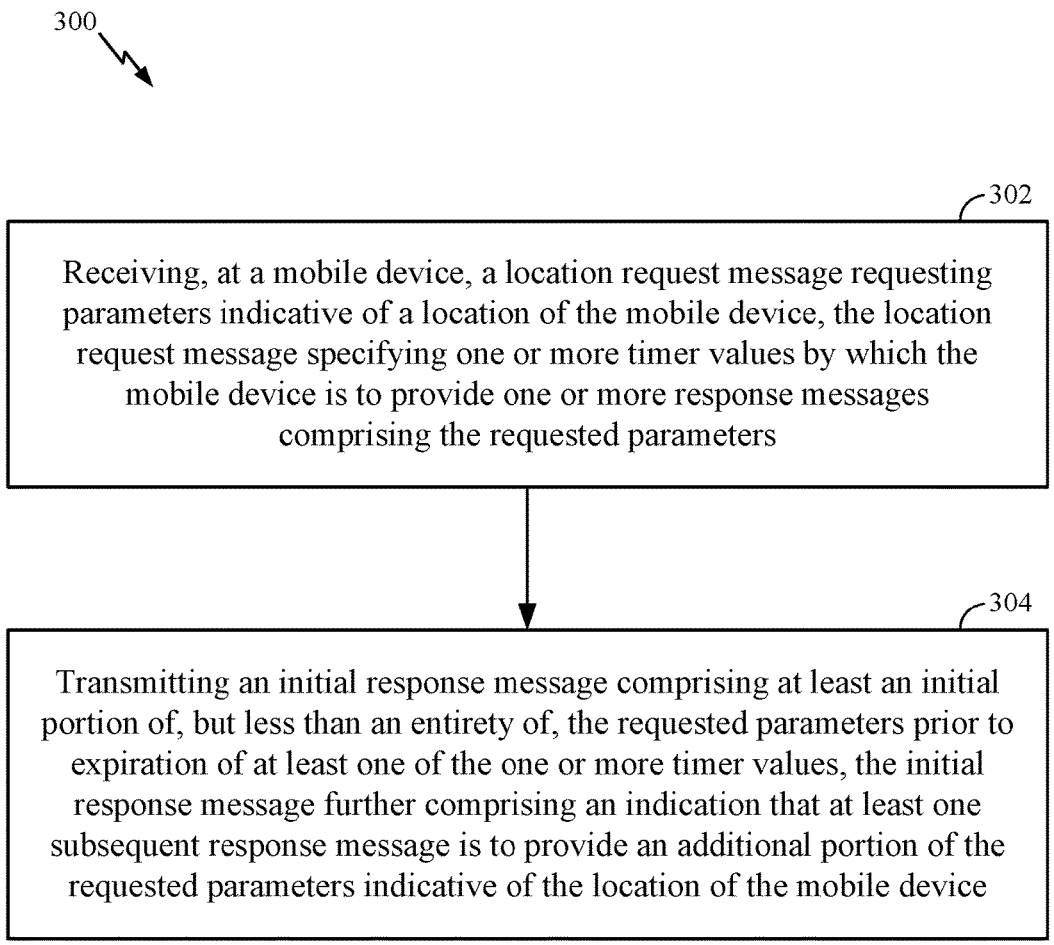
FIG. 3 is a flow diagram illustrating an implementation of an example process for handling an early position fix for LPP-type positioning sessions.

With this in mind, attention is now drawn to FIG. 3, which is a flow diagram illustrating an implementation of an example process 300 that may be performed, in whole or in part, to facilitate and/or support one or more operations and/or techniques for handling an early position fix for LPP-type positioning sessions for use in or with a location-aware mobile device, such as mobile device 102 of FIG. 1 and/or mobile device 202 of FIG. 2, for example. In some instances, one or more operations of process 300 may, for example, be implemented, at least in part, via a server device, such as one or more servers 116, 118, and/or 120 of FIG. 1 and/or server 204 of FIG. 2, or any combination of a server device and a mobile device. It should be noted that information acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 300 may, for example, begin at operation 302 with receiving, at a mobile device, a location request message requesting parameters indicative of a location of the mobile device, the location request message specifying one or more timer values by which the mobile device is to provide one or more response messages comprising the requested parameters. As was indicated, at times, a location request message may comprise, for example, SUPL INIT message (e.g., message 210 of FIG. 2, etc.) transmitted by a suitable location server, and requested parameters may comprise, for example, OTDOA and GNSS measurements, just to illustrate one possible implementation. As was also discussed, in some instances, such as if a positioning session is implemented via one or more 3GPP Release 12 or like standards and/or protocols, for example, a location request message may comprise an IE with two timer values, such as specifying an early response timeout and a final response timeout. An early response timeout may specify a time by which a mobile device should return an early position fix and/or measurements to a location server, for example, and a final response timeout may specify a time by which a final position fix and/or measurements should be returned. As also indicated, at times, instead of specifying two particular timer values, a location server may, for example simply request a mobile device to provide early and final location information once available, such as via appropriate "wildcard" timer values or IEs, for example. These "wildcard" timer values or IEs may, for example, indicate to a mobile device that timing of transmitting an early position fix and/or measurements is left to the mobile device. In some instances, a timer value for an early timeout may, for example, be set as or equal to a timer value for a final timeout, again, to indicate that a decision with respect to timing of transmitting an early position fix and/or measurements is left to a mobile device.

With regard to operation 304, an initial response message comprising at least an initial portion of, but less than an entirety of, the requested parameters may, for example, be transmitted, such as prior to expiration of at least one of the one or more timer values, the initial response message further comprising an indication that at least one subsequent response message is to provide an additional portion of the requested parameters indicative of the location of the mobile device. For example, here, as also discussed above, a mobile device may search for and/or measure signals from a number of wireless transmitters, and may transmit an initial response message at the expiration of an early timeout. In some instances, an initial response message may be transmitted without reporting a location error and may comprise, for example, at least an initial portion of parameters requested by a location server, such as OTDOA measurements but not requested GNSS measurements, as one possible example. An initial response message may also include a flag or like IE to indicate to a location server that one or more subsequent messages are expected to provide additional location parameters, such as GNSS measurements that were not included in the initial response message, for example.

In some instances, having transmitted an initial response message, a mobile device may continue to search for wireless signals to obtain additional portion of requested parameters, such as GNSS measurements, for example, until a new response timeout. At times, a new response timeout may, for example, be determined and/or set by a mobile device (e.g., dynamically, etc.), rather than a location server, and may be based, at least in part, on a particular signal environment, signal conditions, etc. associated with the mobile device. A mobile device may subsequently obtain GNSS measurements, if available, and may, for example, transmit another message with these additional location parameters, such as prior to or at the expiration of a new response timeout. This message may also include a flag or like IE to indicate to a location server that no more subsequent messages with location parameters are expected, as was also discussed. In some instances, a subsequent message may include, as a way of recommendation, a new response timeout, which a location server may then specify as a value for responding with an early position fix and/or measurements, such as, for example, in one or more subsequent positioning sessions. At times, if additional location parameters that were not included in an initial response message, such as GNSS measurements, for example, are not available within a timeframe specified via a new response timeout, a mobile device may report a location error with respect to these location parameters and may transmit a message indicating that no more subsequent messages with location parameters are expected.

Figure 4:
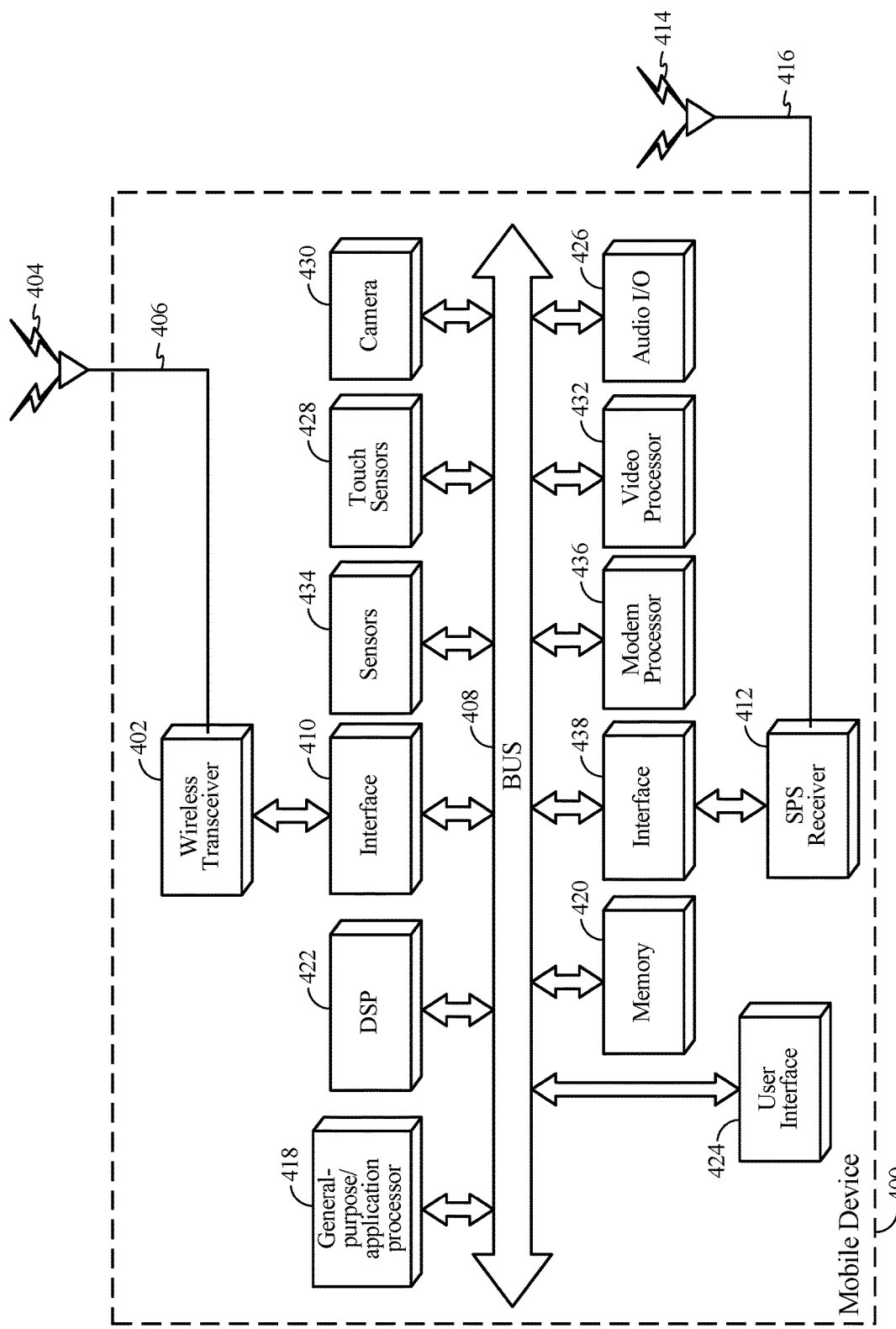
FIG. 4 is a schematic diagram illustrating an implementation of an example computing environment associated with a mobile device.

FIG. 4 is a schematic diagram of an implementation of an example computing environment associated with a mobile device that may be used, at least in part, to facilitate or support one or more operations or processes for handling an early position fix for LPP-type positioning sessions. An example computing environment may comprise, for example, a mobile device 400 that may include one or more features and/or aspects of mobile device 102 of FIG. 1 and/or mobile device 202 of FIG. 2, though claimed subject matter is not so limited. For example, in some instances, mobile device 400 may comprise a wireless transceiver 402 capable of transmitting and/or receiving wireless signals, referenced generally at 404, such as via an antenna 406 over a suitable wireless communications network. Wireless transceiver 402 may, for example, be capable of sending and/or receiving one or more suitable communications, such as one or more communications discussed with reference to FIGS. 1-3. Wireless transceiver 402 may, for example, be coupled or connected to a bus 408 via a wireless transceiver bus interface 410. Depending on an implementation, at times, wireless transceiver bus interface 410 may, for example, be at least partially integrated with wireless transceiver 402. Some implementations may include multiple wireless transceivers 402 or antennas 406 so as to enable transmitting or receiving signals according to a corresponding multiple wireless communication standards such as Wireless Local Area Network (WLAN) or Wi-Fi, Code Division Multiple Access (CDMA), Wideband-CDMA (W-CDMA), Long Term Evolution (LTE), Bluetooth®, just to name a few examples.

In an implementation, mobile device 400 may, for example, comprise an SPS or like receiver 412 capable of receiving or acquiring one or more SPS or other suitable wireless signals 414, such as via an SPS or like antenna 416. SPS receiver 412 may process, in whole or in part, one or more acquired SPS signals 414 for determining a location of mobile device 400. In some instances, one or more general-purpose application processors 418 (henceforth referred to as "processor"), memory 420, digital signal processor(s) (DSP) 422, or like specialized devices or processors not shown may be utilized to process acquired SPS signals 414, in whole or in part, calculate a location of mobile device 400, such as in conjunction with SPS receiver 412, or the like. Storage of SPS or other signals for implementing one or more positioning operations, such as in connection with one or more techniques for handling an early position fix for LPP-type positioning sessions, for example, may be performed, at least in part, in memory 420, suitable registers or buffers (not shown). Although not shown, it should be appreciated that in at least one implementation one or more processors 418, memory 420, DSPs 422, or like specialized devices or processors may comprise one or more processing modules capable of receiving a location request message requesting parameters indicative of a location of mobile device 400, the location request message specifying one or more timer values by which mobile device 400 is to provide one or more response messages comprising the requested parameters; and transmitting an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of mobile device 400.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 418 or DSP 422 may include one or more processors, controllers, microprocessors, microcontrollers, application specific integrated circuits, digital signal processors, programmable logic devices, field programmable gate arrays, or the like, or any combination thereof. Thus, at times, processor 418 or DSP 422 or any combination thereof may comprise or be representative of means for receiving a location request message requesting parameters indicative of a location of mobile device 400, the location request message specifying one or more timer values by which the mobile device is to provide one or more response messages comprising the requested parameters, such as to implement operation 302 of FIG. 3, at least in part. In addition, in at least one implementation, processor 418 or DSP 422 may be representative of or comprise, for example, means for transmitting an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of mobile device 400, such as to implement operation 304 of FIG. 3, at least in part. Also, in at least one implementation, processor 418 or DSP 422 may be representative of or comprise, for example, means for detecting signal environment and/or signal conditions associated with mobile device 400, such as to facilitate and/or support operation 302 of FIG. 3 and/or operation 304 of FIG. 3, at least in part. In some instances, processor 418 or DSP 422 may be representative of or comprise, for example, means for determining a timer value for a new timeout for transmitting the at least one subsequent response message based, at least in part, on the detected signal environment and/or signal conditions, such as to facilitate and/or support operation 302 of FIG. 3 and/or operation 304 of FIG. 3, at least in part. It should be noted that, in one or more implementations, means for receiving a location request message requesting parameters indicative of a location of mobile device 400, the location request message specifying one or more timer values by which the mobile device is to provide one or more response messages comprising the requested parameters, and/or means for transmitting an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of mobile device 400 may comprise and/or be implemented via, at least in part, wireless transceiver 402 and/or SPS receiver 412.

As illustrated, DSP 422 may be coupled or connected to processor 418 and memory 420 via bus 408. Although not shown, in some instances, bus 408 may comprise one or more bus interfaces that may be integrated with one or more applicable components of mobile device 400, such as DSP 422, processor 418, memory 420, or the like. In various embodiments, one or more operations or functions described herein may be performed in response to execution of one or more machine-readable instructions stored in memory 420, such as on a computer-readable storage medium, such as RAM, ROM, FLASH, disc drive, etc., just to name a few examples. Instructions may, for example, be executable via processor 418, one or more specialized processors not shown, DSP 422, or the like. Memory 420 may comprise a non-transitory processor-readable memory, computer-readable memory, etc. that may store software code (e.g., programming code, instructions, etc.) that may be executable by processor 418, DSP 422, or the like to perform operations or functions described herein.

Mobile device 400 may comprise a user interface 424, which may include any one of several devices such as, for example, a speaker, microphone, display device, vibration device, keyboard, touch screen, etc., just to name a few examples. In at least one implementation, user interface 424 may enable a user to interact with one or more applications hosted on mobile device 400. For example, one or more devices of user interface 424 may store analog or digital signals on memory 420 to be further processed by DSP 422, processor 418, etc. in response to input or action from a user. Similarly, one or more applications hosted on mobile device 400 may store analog or digital signals in memory 420 to present an output signal to a user. In some implementations, mobile device 400 may optionally include a dedicated audio input/output (I/O) device 426 comprising, for example, a dedicated speaker, microphone, digital to analog circuitry, analog to digital circuitry, amplifiers, gain control, or the like. It should be understood, however, that this is merely an example of how audio I/O device 426 may be implemented, and that claimed subject matter is not limited in this respect. As seen, mobile device 400 may comprise one or more touch sensors 428 responsive to touching or like pressure applied on a keyboard, touch screen, or the like.

In an implementation, mobile device 400 may comprise, for example, a camera 440, dedicated or otherwise, such as for capturing still or moving imagery, or the like. Camera 440 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 418, DSP 422, or the like. Optionally or alternatively, a video processor 432, dedicated or otherwise, may perform conditioning, encoding, compression, or manipulation of signals representing one or more captured images. Additionally, video processor 432 may, for example, decode or decompress one or more stored images for presentation on a display (not shown) of mobile device 400.

Mobile device 400 may comprise one or more sensors 434 coupled or connected to bus 408, such as, for example, one or more inertial sensors, ambient environment sensors, or the like. Inertial sensors of sensors 434 may comprise, for example, one or more accelerometers (e.g., collectively responding to acceleration of mobile device 400 in one, two, or three dimensions, etc.), gyroscopes or magnetometers (e.g., to support one or more compass or like applications, etc.), etc., just to illustrate a few examples. Ambient environment sensors of mobile device 400 may comprise, for example, one or more barometric pressure sensors, temperature sensors, ambient light detectors, camera sensors, microphones, etc., just to name few examples. Sensors 434 may generate analog or digital signals that may be stored in memory 420 and may be processed by DSP 422, processor 418, etc., such as in support of one or more applications directed to positioning or navigation operations, wireless communications, radio heat map learning, video gaming or the like.

In a particular implementation, mobile device 400 may comprise, for example, a modem processor 436, dedicated or otherwise, capable of performing baseband processing of signals received or downconverted via wireless transceiver 402, SPS receiver 412, or the like. Similarly, modem processor 436 may perform baseband processing of signals to be upconverted for transmission via wireless transceiver 402, for example. In alternative implementations, instead of having a dedicated modem processor, baseband processing may be performed, at least in part, by processor 418, DSP 422, or the like. In addition, in some instances, an interface 438, although illustrated as a separate component, may be integrated, in whole or in part, with one or more applicable components of mobile device 400, such as bus 408 or SPS receiver 412, for example. Optionally or alternatively, SPS receiver 412 may be coupled or connected to bus 408 directly. It should be understood, however, that these are merely examples of components or structures that may perform baseband processing, and that claimed subject matter is not limited in this regard.

Figure 5:
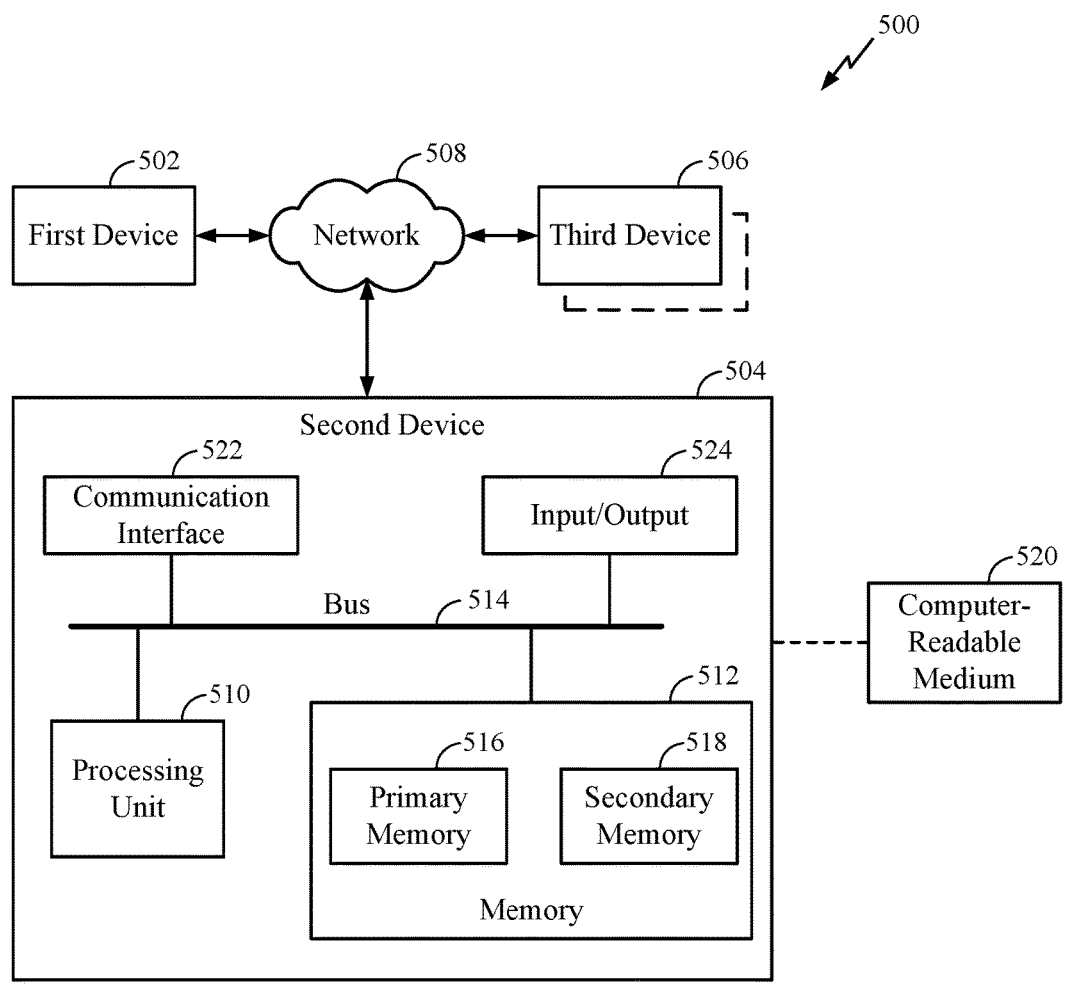
FIG. 5 is a schematic diagram illustrating an implementation of an example computing environment associated with a server.

FIG. 5 is a schematic diagram illustrating an implementation of an example computing environment or system 500 that may be associated with or include one or more servers or other devices capable of partially or substantially implementing and/or supporting one or more operations and/or processes for handling an early position fix for LPP-type positioning sessions, such as discussed above in connection with FIGS. 1-3, for example. Computing environment 500 may include, for example, a first device 502, a second device 504, a third device 506, etc., which may be operatively coupled together via a communications network 508. In some instances, first device 502 may comprise a server capable of providing positioning assistance parameters, such as, for example, identities, locations, etc. of wireless transmitters, radio heat map, base station almanac, electronic digital map, database of wireless transmitters, bias estimates, signal measurements, or the like. For example, first device 502 may also comprise a server capable of providing an electronic digital map to a mobile device based, at least in part, on a coarse or rough estimate of a location of the mobile device, upon request, or the like. First device 502 may also comprise a server capable of providing any other suitable positioning assistance parameters (e.g., an electronic digital map, radio heat map, etc.), relevant to a location of a mobile device. Second device 504 or third device 506 may comprise, for example, mobile devices, though claimed subject matter is not so limited. For example, in some instances, second device 504 may comprise a server functionally or structurally similar to first device 502, just to illustrate another possible implementation. In addition, communications network 508 may comprise, for example, one or more wireless transmitters, such as access points, femtocells, or the like. Of course, claimed subject matter is not limited in scope in these respects.

First device 502, second device 504, or third device 506 may be representative of any device, appliance, platform, or machine that may be capable of exchanging parameters and/or information over communications network 508. By way of example but not limitation, any of first device 502, second device 504, or third device 506 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 502, 504, and 506, respectively, may comprise one or more of a mobile device, wireless transmitter or receiver, server, etc. in accordance with example implementations described herein.

In an implementation, communications network 508 may be representative of one or more communication links, processes, or resources capable of supporting an exchange of information between at least two of first device 502, second device 504, or third device 506. By way of example but not limitation, communications network 508 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 506, there may be additional like devices operatively coupled to communications network 508. It is also recognized that all or part of various devices or networks shown in computing environment 500, or processes or methods, as described herein, may be implemented using or otherwise including hardware, firmware, software, or any combination thereof.

By way of example but not limitation, second device 504 may include at least one processing unit 510 that may be operatively coupled to a memory 512 via a bus 514. Processing unit 510 may be representative of one or more circuits capable of performing at least a portion of a suitable computing procedure or process. For example, processing unit 510 may include one or more processors, controllers, microprocessors, microcontrollers, application specific integrated circuits, digital signal processors, programmable logic devices, field programmable gate arrays, or the like, or any combination thereof. Although not shown, second device 504 may include a location-tracking unit that may initiate a position fix of a suitable mobile device, such as in an area of interest, for example, based, at least in part, on one or more received or acquired wireless signals, such as from an SPS, one or more Wi-Fi access points, etc. In some implementations, a location-tracking unit may be at least partially integrated with a suitable processing unit, such as processing unit 510, for example, though claimed subject matter is not so limited. In certain server-based or server-supported implementations, processing unit 510 may, for example, comprise means for transmitting a location request message requesting parameters indicative of a location of a mobile device, the location request message specifying one or more timer values by which a mobile device is to provide one or more response messages comprising the requested parameters, such as to facilitate or support operations 302 and/or 304 of FIG. 3, at least in part. In some instances, processing unit 510 may, for example, comprise means for receiving an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device, such as to facilitate or support operations 302 and/or 304 of FIG. 3, at least in part.

Memory 512 may be representative of any information storage mechanism or appliance. Memory 512 may include, for example, a primary memory 516 and a secondary memory 518. Primary memory 516 may include, for example, a random access memory, read only memory, etc. While illustrated in this example as being separate from processing unit 510, it should be understood that all or part of primary memory 516 may be provided within or otherwise co-located/coupled with processing unit 510. Secondary memory 518 may include, for example, same or similar type of memory as primary memory or one or more information storage devices or systems, such as, for example, a disk drive, an optical disc drive, a tape drive, a solid state memory drive, etc. In certain implementations, secondary memory 518 may be operatively receptive of, or otherwise configurable to couple to, a computer-readable medium 520. Computer-readable medium 520 may include, for example, any non-transitory storage medium that may carry or make accessible information, code, or instructions for one or more of devices in computing environment 500. Computer-readable medium 520 may also be referred to as a machine-readable medium, storage medium, or the like.

Second device 504 may include, for example, a communication interface 522 that may provide for or otherwise support an operative coupling of second device 504 to at least communications network 508. By way of example but not limitation, communication interface 522 may include a network interface device or card, a modem, a router, a switch, a transceiver, and the like. Second device 504 may also include, for example, an input/output device 524. Input/output device 524 may be representative of one or more devices or features that may be configurable to accept or otherwise introduce human or machine inputs, or one or more devices or features that may be capable of delivering or otherwise providing for human or machine outputs. By way of example but not limitation, input/output device 524 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") net-work, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, comprising:
   receiving a location request message requesting parameters indicative of a location of the mobile device, the location request message specifying one or more timer values by which the mobile device is to provide one or more response messages comprising the requested parameters;
   transmitting an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device; and
   transmitting the at least one subsequent response message comprising the additional portion of the requested parameters after expiration of the at least one of the one or more timer values specified via the location request message, wherein the at least one subsequent response message comprises an intermediate response message and a final response message that is transmitted after the intermediate response message.

2. The method of claim 1, wherein the one or more timer values comprise a timer value for an early timeout and a timer value for a final timeout.

3. The method of claim 2, wherein the timer value for the early timeout is specified for transmitting the initial response message and the timer value for the final timeout is specified for transmitting the final response message.

4. The method of claim 1, wherein the one or more timer values are set as one or more "wildcard" timer values.

5. The method of claim 1, and further comprising:
   detecting signal environment or signal conditions associated with the mobile device; and
   determining a timer value for a new timeout for transmitting the at least one subsequent response message based, at least in part, on the detected signal environment or signal conditions.

6. The method of claim 5, wherein the timer value for the new timeout is determined so as to increase a probability of obtaining the at least initial portion of the requested parameters within a shorter timeframe than that specified by a location server via a maximum response time value.

7. The method of claim 5, and further comprising transmitting the timer value for the new timeout to a location server for use in one or more positioning sessions.

8. The method of claim 7, wherein the location server comprises: an Enhanced Serving Mobile Location Center (E-SMLC); a Home Serving Mobile Location Center (H-SMLC); a Secure User Plane Location (SUPL) Location Platform (SLP); or an emergency SLP (eSLP).

9. The method of claim 5, and further comprising reporting a location error if the additional portion of the requested parameters is unavailable prior to expiration of the timer value for the new timeout, the reporting including an indication that no more subsequent response messages with the additional portion of the requested parameters are expected.

10. The method of claim 1, wherein the requested parameters comprise at least observed time difference of arrival (OTDOA) measurements and Global Navigation Satellite System (GNSS) measurements.

11. The method of claim 10, wherein the initial portion of the requested parameters comprise the OTDOA measurements and the additional portion of the requested parameters comprise the GNSS measurements.

12. The method of claim 1, wherein the additional portion of the requested parameters comprises at least one of: observed time difference of arrival (OTDOA) measurements; updated OTDOA measurements; Global Navigation Satellite System (GNSS) measurements; updated GNSS measurements, or any combination thereof.

13. The method of claim 1, wherein the at least initial portion of the requested parameters is transmitted without reporting a location error.

14. The method of claim 1, wherein the one or more response messages are transmitted according to at least one of: an LTE positioning protocol (LPP); an LPP extensions (LPPe) protocol; a Secure User Plane Location (SUPL) user plane location protocol (ULP); a Location Services Application Protocol (LCS-AP) control plane protocol, or any combination thereof.

15. The method of claim 1, wherein the location request message is received to implement a search for acquisition of positioning reference signals (PRS).

16. The method of claim 1, wherein the at least one subsequent response message comprises an indication that no more subsequent response messages with the additional portion of the requested parameters are expected.

17. An apparatus comprising:
   means for receiving a location request message requesting parameters indicative of a location of a mobile device, the location request message specifying one or more timer values by which the mobile device is to provide one or more response messages comprising the requested parameters;
   means for transmitting an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device; and means for transmitting the at least one subsequent response message comprising the additional portion of the requested parameters after expiration of the at least one of the one or more timer values specified via the location request message, wherein the at least one subsequent response message comprises an intermediate response message and a final response message that is transmitted after the intermediate response message.

18. The apparatus of claim 17, and further comprising:
means for detecting signal environment or signal conditions associated with the mobile device; and
means for determining a timer value for a new timeout for transmitting the at least one subsequent response message based, at least in part, on the detected signal environment or signal conditions.

19. The apparatus of claim 18, wherein the means for determining the timer value for the new timeout are for determining the timer value for the new timeout so as to increase a probability of obtaining the at least initial portion of the requested parameters within a shorter timeframe than that specified by a location server via a maximum response time value.

20. An apparatus comprising:
a communication interface coupled to a receiver of a mobile device to communicate with an electronic communications network and one or more processors coupled to a memory and to the communication interface, the communication interface and the one or more processors configured to:
receive a location request message requesting parameters indicative of a location of the mobile device, the location request message specifying one or more timer values by which the mobile device is to provide one or more response messages comprising the requested parameters;
transmit an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device; and
transmit the at least one subsequent response message comprising the additional portion of the requested parameters after expiration of the at least one of the one or more timer values specified via the location request message, wherein the at least one subsequent response message comprises an intermediate response message and a final response message that is transmitted after the intermediate response message.

21. The apparatus of claim 20, wherein the communication interface and the one or more processors are further configured to:
detect signal environment or signal conditions associated with the mobile device; and
determine a timer value for a new timeout for transmitting the at least one subsequent response message based, at least in part, on the detected signal environment or signal conditions.

22. The apparatus of claim 21, wherein the communication interface and the one or more processors are configured to determine the timer value for the new timeout so as to increase a probability of obtaining the at least initial portion of the requested parameters within a shorter timeframe than that specified by a location server via a maximum response time value.

23. The apparatus of claim 21, wherein the communication interface and the one or more processors are further configured to transmit the timer value for the new timeout to a location server for use in one or more positioning sessions.

24. The apparatus of claim 21, wherein the communication interface and the one or more processors are further configured to report a location error if the additional portion of the requested parameters is unavailable prior to expiration of the timer value for the new timeout, the report to include an indication that no more subsequent response messages with the additional portion of the requested parameters are expected.

25. The apparatus of claim 20, wherein the communication interface and the one or more processors are configured to transmit the at least initial portion of the requested parameters without reporting a location error.

26. The apparatus of claim 20, wherein the at least one subsequent response message comprises an indication that no more subsequent response messages with the additional portion of the requested parameters are expected.

27. A non-transitory storage medium having instructions executable by a processor to:
receive a location request message requesting parameters indicative of a location of a mobile device, the location request message specifying one or more timer values by which the mobile device is to provide one or more response messages comprising the requested parameters;
transmit an initial response message comprising at least an initial portion of, but less than an entirety of, the requested parameters prior to expiration of at least one of the one or more timer values, the initial response message further comprising an indication that at least one subsequent response message is to provide an additional portion of the requested parameters indicative of the location of the mobile device; and
transmit the at least one subsequent response message comprising the additional portion of the requested parameters after expiration of the at least one of the one or more timer values specified via the location request message, wherein the at least one subsequent response message comprises an intermediate response message and a final response message that is transmitted after the intermediate response message.

28. The non-transitory storage medium of claim 27, wherein the instructions executable by the processor further comprise instructions to:
detect signal environment or signal conditions associated with the mobile device; and
determine a timer value for a new timeout for transmitting the at least one subsequent response message based, at least in part, on the detected signal environment or signal conditions.

* * * * *